United States Patent
Zhou et al.

(10) Patent No.: US 9,234,115 B2
(45) Date of Patent: Jan. 12, 2016

(54) WATER-BASED AMINE CURING AGENTS FOR CURABLE RESIN SYSTEMS

(75) Inventors: Hui Zhou, The Woodlands, TX (US); Derek Scott Kincaid, Spring, TX (US)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 238 days.

(21) Appl. No.: 14/116,386

(22) PCT Filed: Jun. 5, 2012

(86) PCT No.: PCT/US2012/040818
§ 371 (c)(1),
(2), (4) Date: Nov. 8, 2013

(87) PCT Pub. No.: WO2012/170369
PCT Pub. Date: Dec. 13, 2012

(65) Prior Publication Data
US 2014/0099508 A1 Apr. 10, 2014

Related U.S. Application Data

(60) Provisional application No. 61/494,490, filed on Jun. 8, 2011.

(51) Int. Cl.
 C08L 63/00 (2006.01)
 C09D 163/00 (2006.01)
 C08K 5/17 (2006.01)
 C08G 59/14 (2006.01)
 C08K 3/00 (2006.01)

(52) U.S. Cl.
 CPC .......... *C09D 163/00* (2013.01); *C08G 59/1477* (2013.01); *C08K 5/17* (2013.01); *C08K 3/0033* (2013.01); *Y10T 428/31511* (2015.04)

(58) Field of Classification Search
 CPC ........................................................ C08L 63/00
 USPC ................................ 525/523, 526; 528/88, 93
 See application file for complete search history.

(56) References Cited

U.S. PATENT DOCUMENTS

| | | | | |
|---|---|---|---|---|
| 3,317,469 | A | * 5/1967 | Noeske | C08G 59/5026 528/122 |
| 4,197,389 | A | * 4/1980 | Becker | C08G 59/184 428/413 |
| 4,532,266 | A | * 7/1985 | Rasshofer | C08G 18/10 521/134 |
| 4,578,284 | A | * 3/1986 | Gruber | C03C 25/106 427/163.2 |
| 5,032,629 | A | * 7/1991 | Hansen | C08G 59/184 523/414 |
| 5,246,984 | A | 9/1993 | Darwen et al. | |
| 5,489,630 | A | * 2/1996 | Walker | C08L 63/00 523/404 |
| 6,013,757 | A | * 1/2000 | Corley | C08G 59/54 428/413 |
| 6,077,884 | A | 6/2000 | Hess et al. | |
| 6,245,835 | B1 | * 6/2001 | Klein | C08G 59/066 523/402 |
| 6,303,672 | B1 | 10/2001 | Papalos et al. | |
| 6,653,369 | B2 | * 11/2003 | Gerlitz | C08G 59/184 523/404 |
| 7,615,584 | B2 | * 11/2009 | Matthias | C08G 59/184 523/400 |

OTHER PUBLICATIONS

US 6,013,751, 01/2000, Corley et al. (withdrawn)

* cited by examiner

*Primary Examiner* — Megan McCulley

(57) ABSTRACT

The present disclosure relates to a water-based amine curing agent which is a reaction product obtained from the reaction of an aqueous epoxy resin dispersion and a polyamine component. The water-based amine curing agent may be used as part of a two component coating system in the curing of modified or unmodified liquid or pre-dispersed curable resin.

17 Claims, No Drawings

WATER-BASED AMINE CURING AGENTS FOR CURABLE RESIN SYSTEMS

CROSS-REFERENCE TO RELATED APPLICATION

Not Applicable.

STATEMENT REGARDING FEDERALLY SPONSORED RESEARCH OR DEVELOPMENT

Not applicable.

FIELD OF THE INVENTION

The present disclosure is directed to water-based curing agents and articles produced from such compositions.

BACKGROUND OF THE INVENTION

Epoxy resin based systems are widely used as sealing materials, coating compositions, adhesives, etc, in a variety of fields such as electricity, electronics, and civil engineering and construction, because, when cured, they exhibit excellent electrical insulating properties, are moisture proof, heat resistant, soldering resistant, chemical resistant, durable, have excellent adhesive properties and mechanical strength.

Two part epoxy resin based systems generally include a curable epoxy resin and a curing agent for the epoxy resin. As typical representative examples of curing agents, there are, for example, diethylenetriamine, triethylenetetramine, isophoronediamine, diaminodiphenylmethane, diaminodiphenylsulfone, polyamides, dicyandiamide, hexahydrophthalic anhydride, methyltetrahydrophthalic anhydride, methyl nadic anhydride, tertiary amines, imidazoles, and amine complexes of boron trifluoride. During preparation, both the epoxy resin and curing agent are generally dispersed or dissolved in a solvent, for example, an organic solvent, to reduce viscosity. Significant environmental concerns are created due to the use of such solvent-based systems since they create the potential for environmental pollution and health hazards.

Numerous curing agents dissolved or emulsified in water which may be used to cure epoxy resins have been developed to address environmental and health concerns. For example:

U.S. Pat. No. 4,197,389 discloses a curing agent prepared by reacting at least one polyepoxide compound with at least one polyalkylene polyether polyol to form an adduct which is subsequently reacted with a polyamine;

U.S. Pat. No. 5,246,984 teaches a two-component water based epoxy coating composition comprising an aqueous dispersion of a blend of a water-compatible polyamine-epoxy adduct prepared by reacting a monoepoxide and polyepoxide with a polyamine and a resin-compatible polyamine epoxy adduct prepared by reacting a monoepoxide with an aliphatic or cycloaliphatic polyamine;

U.S. Pat. Nos. 5,032,629 and 5,489,630 describe water compatible polyamine-epoxy adducts prepared by reacting poly(alkylene oxide) mono- or diamines with a polyepoxide to form intermediates which are then subsequently reacted with an excess of a polyamine;

U.S. Pat. No. 6,013,757 discloses waterborne polyamide curing agents produced from the reaction of long-chain dicarboxylic acids and aminoalkylpiperazines;

U.S. Pat. No. 6,245,835 describes amino-epoxy adduct curing agents prepared by reacting a polyoxyalkylenediamine with a polyepoxide and polyoxyalkylene glycol diglycidyl ether and emulsifying the reaction product in water;

U.S. Pat. No. 6,653,369 teaches a water dilutable amine curing agent which includes: an adduct obtained by a two-stage reaction of a polyepoxide with an amine; and an emulsifier obtained from the reaction of polyepoxides with chain extenders; and U.S. Pat. No. 7,615,584 discloses a curing agent formed by blending a reaction product of a polyamine and aqueous epoxy resin with an amine-functional curing agent.

Some problems in using conventional solvent-free curing agents include: they exhibit a less than desirable viscosity making them difficult to apply and process; they are unable to properly wet the substrates to form continuous coatings or adhere to the surface of the substrates to which they are applied; they exhibit a short pot life when mixed with an epoxy resin; or are difficult to manufacture. It is an object of the present invention to provide a novel low VOC curing agent for use with aqueous epoxy resin compositions, which overcomes these problems as well as any problems arising from odor, toxicity and/or inflammability caused by the use of solvents, can be easily manufactured, and exhibits both low viscosity at high solids content and improved pot life.

SUMMARY OF THE INVENTION

The present disclosure provides a water-based amine curing agent for a curable resin which is a reaction product of:
 (A) an aqueous epoxy dispersion; and
 (B) a polyamine component consisting of a cycloaliphatic polyamine compound.
The reaction product may be formed in the presence or absence of a surfactant.

In another embodiment, the present disclosure provides a process for the preparation of the water-based amine curing agent which includes contacting an excess of the polyamine component (B) with the aqueous epoxy dispersion component (A) and optionally in the presence of a surfactant component (C) such that the reaction product contains active amine hydrogens capable of reacting with a curable resin.

In still another embodiment, the present disclosure relates to the use of the above water-based amine curing agent in a two component coating system for curing modified or unmodified liquid or pre-dispersed curable resin.

DETAILED DESCRIPTION OF THE INVENTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "an epoxy" means one epoxy or more than one epoxy.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

As used herein the term "cycloaliphatic radical" refers to a radical having a valence of at least one, and comprising an array of atoms which is cyclic but which is not aromatic. Thus, as defined herein a "cycloaliphatic radical" does not contain an aromatic group. A "cycloaliphatic radical" may also comprise one or more noncyclic components. For example, a cyclopentylmethyl group ($C_5H_9CH_2$—) is a $C_6$ cycloaliphatic radical which comprises a cyclopentyl ring (the array of atoms which is cyclic but which is not aromatic) and a methylene group (the noncyclic component). The term "a $C_6$-$C_{20}$ cycloaliphatic radical" includes cycloaliphatic radicals containing at least six but no more than 20 carbon atoms.

The term "low VOC" means that the curing agent when in liquid form contains less than about 10 weight % of volatile organic compounds, preferably less than about 5 weight % of volatile organic compounds, more preferably less than 1 weight % of volatile organic compounds and even more preferably less than about 0.1 weight % of volatile organic compounds based on the total liquid curing agent weight.

If the specification states a component or feature "may", "can", "could", or "might" be included or have a characteristic, that particular component or feature is not required to be included or have the characteristic.

The present invention is generally directed to water-based amine curing agents and methods of making such amine curing agents. These water-based amine curing agents can be used to cure, harden and/or cross-link a curable resin. The water-based amine curing agents of the present disclosure are reaction products obtained from the reaction of: (A) an aqueous epoxy dispersion component; and (B) a polyamine component containing a cycloaliphatic polyamine compound. The reaction product may be formed either in the presence or absence of a surfactant. The water-based amine curing agents of the present disclosure are easily manufactured, exhibit low viscosity at high solids content, have good drying rates, have low VOC, surprisingly retain stable viscosity over a relatively long period of time, and can be applied to substrates with curable resins to yield transparent high gloss coatings.

According to one embodiment, the aqueous epoxy dispersion component contains a reactive epoxy resin having a 1,2-epoxy equivalency (functionality) on the average, of greater than 0.8 epoxide groups per molecule, and in some applications at least 1.5, to 6.5 epoxide groups per molecule. The reactive epoxy resin can be saturated or unsaturated, linear or branched, aliphatic, cycloaliphatic, aromatic or heterocyclic, and may bear substituents which do not materially interfere during the reaction with the cycloaliphatic polyamine compound. Such substituents can include bromine or fluorine. The epoxy resin may be monomeric or polymeric, liquid or solid, for example, a low melting solid at room temperature. In one embodiment, the epoxy resin includes glycidyl ethers prepared by reacting epichlorohydrin with a compound containing at least 1.5 aromatic hydroxyl groups carried out under alkaline reaction conditions. In other embodiments the epoxy resin includes monoepoxies, diglycidyl ethers of dihydric compounds, epoxy novolacs and cycloaliphatic epoxies. Generally the epoxy resins contain a distribution of compounds with a varying number of repeat units. Further, the epoxy resin can be a mixture of epoxy resins. For example, in one embodiment, the epoxy resin can comprise a monoepoxide resin and di- and/or a multi-functional epoxy resin having functionalities from 0.7 to 1.3 and from 1.5 to 2.5.

In one embodiment, the reactive epoxy resin is pre-dispersed in water to form the aqueous epoxy resin dispersion using known dispersants and processes. Generally, the amount of reactive epoxy resin dispersed ranges from about 20%-75% by weight, based on the total weight of the aqueous epoxy resin dispersion. In another embodiment, the amount of epoxy resin dispersed ranges from about 45%-55% by weight, based on the total weight of the aqueous epoxy resin dispersion.

Examples of specific reactive epoxy resins which may be used include, but are not limited to, those represented by the formulae

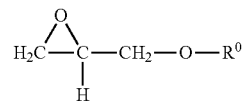

where $R^0$ is a linear or branched $C_{1-22}$ alkyl group,

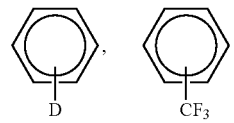

or —$(CH_2)_3Si(OCH_3)_3$ where D is a linear or branched $C_{1-22}$ alkyl group

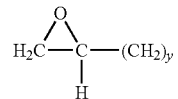

where y is an integer from 1 to 6;

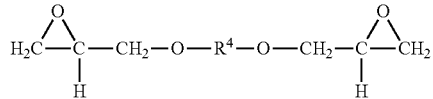

where $R^4$ is a divalent aliphatic, divalent cycloaliphatic, divalent aryl, or divalent arylaliphatic group;

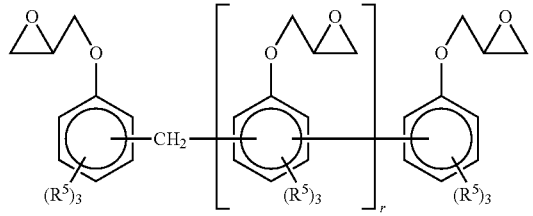

where $R^5$ is independently hydrogen or a $C_{1-10}$ alkyl group and r is an integer from 0 to 6; and

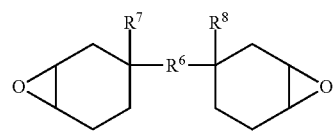

where $R^6$ is a divalent $C_{1-20}$ aliphatic group optionally containing ether or ester group(s) or together with $R^7$ and $R^8$ forms a spiro ring optionally containing heteroatoms, and $R^7$ and $R^8$ are independently hydrogen or together with $R^6$ forms a Spiro ring optionally containing heteroatoms; or

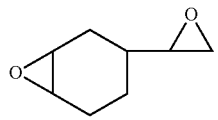

In some embodiments, $R^4$ is a divalent cycloaliphatic group having the formula

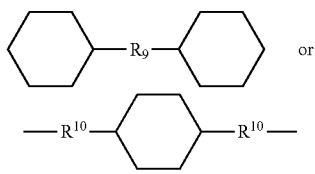

where $R^9$ and $R^{10}$ are each independently a $C_{1-20}$ alkylene group or a divalent arylaliphatic group having the formula

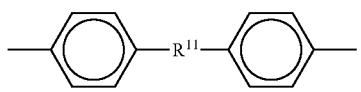

where $R^{11}$ is a $C_{1-20}$ alkylene group.

According to one embodiment, the reactive epoxy resin is a difunctional epoxy resin selected from a diglycidyl ether of a dihydric phenol, a diglycidyl ether of a hydrogenated dihydric phenol, an aliphatic glycidyl ether, an epoxy novolac and a cycloaliphatic epoxy.

Diglycidyl ethers of dihydric phenols can be produced, for example, by reacting a dihydric phenol and a suitably substituted epichlorohydrin under alkaline conditions, or in the presence of an acidic catalyst with subsequent alkali treatment. Examples of dihydric phenols include: 2,2-bis(4-hydroxyphenyl) propane (bisphenol-A); 2,2-bis(4-hydroxy-3-tert-butylphenyl) propane; 1,1-bis(4-hydroxyphenyl)ethane; 1,1-bis(4-hydroxyphenyl)isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols also include advancement products of the above diglycidyl ethers of dihydric phenols with dihydric phenols such as bisphenol-A.

Diglycidyl ethers of hydrogenated dihydric phenols can be produced, for example, by hydrogenation of compounds having two free alcoholic hydroxy groups followed by a glycidation reaction with an epihalohydrin in the presence of a Lewis acid catalyst and subsequent formation of the glycidyl ether by reaction with sodium hydroxide. Examples of suitable dihydric phenols include those listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. Examples of preferred aliphatic glycidyl ethers include those corresponding to the formulas

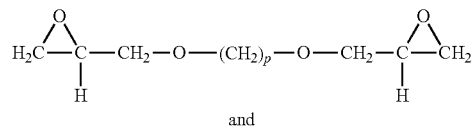

and

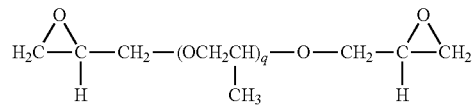

where p is an integer from 2-12, and in some embodiments from 2-6; and
q is an integer from 4-24, and in some embodiments from 4-12.

Examples of aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane Examples of monoepoxies include the glycidyl ethers of phenol, t-butyl phenol, cresol, nonyl phenol, and aliphatic alcohols; and glycidated monoacids and epoxides formed from alpha-olefins and glycidoxyalkylalkoxyslianes.

Epoxy novolacs can be produced by condensation of formaldehyde and a phenol followed by glycidation by reaction of an epihalohydrin in the presence of an alkali. The phenol can be for example, phenol, cresol, nonylphenol and t-butylphenol. Examples of the preferred epoxy novolacs include those corresponding to the formula

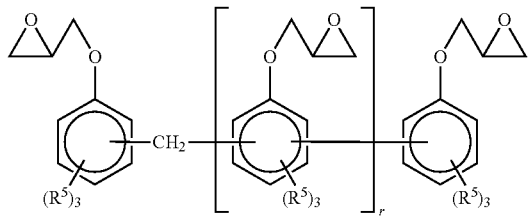

where $R^5$ is independently hydrogen or a $C_{1-10}$ alkyl group and r is an integer from 0-6. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with greater than one olefinc bond with peracetic acid. Examples of cycloaliphatic epoxies include those corresponding to the formula

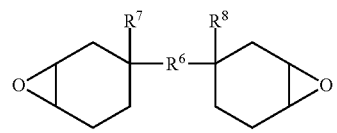

where $R^6$ is a divalent $C_{1-20}$ aliphatic group optionally containing ether or ester group(s) or together with $R^7$ and $R^8$ form a Spiro ring optionally containing heteroatoms, and $R^7$ and $R^8$ are independently hydrogen or together with $R^6$ form a Spiro ring optionally containing heteroatoms; or

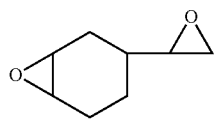

Examples of cycloaliphatic epoxies include, for example, 3,4-epoxycyclohexylmethyl-(3,4-epoxy)cyclohexane carboxylate, dicycloaliphatic diether diepoxy [2-(3,4-epoxy)cyclohexyl-5,5-spiro(3,4-epoxy)-cyclohexane-m-dioxane], bis(3,4-epoxycyclohexylmethyl)adipate, bis(3,4-epoxycyclohexyl)adipate and vinylcyclohexene dioxide [4-(1,2-epoxyethyl)-1,2-epoxycyclohexane]. Cycloaliphatic epoxies also include compounds of the formulas

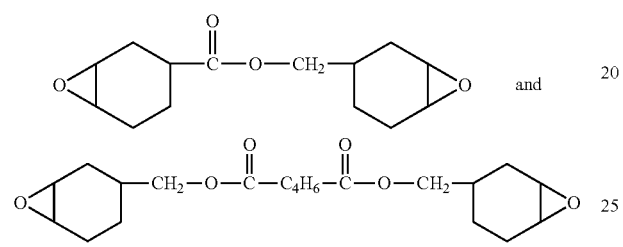

According to one embodiment, the aqueous epoxy resin dispersion has an epoxy equivalent weight of equal to or greater than 450 g/eq. In another embodiment, the aqueous epoxy resin dispersion has an epoxy equivalent weight of less than about 2000 g/eq. In still another embodiment, the aqueous epoxy resin dispersion has an epoxy equivalent weight of between 450 g/eq-2000 g/eq, and in some instances 475 g/eq-600 g/eq and in even some instances 490 g/eq-550 g/eq. The term "epoxy equivalent weight", as used in the present specification, denotes the reciprocal of the equivalents of the epoxy groups contained per gram of an epoxy compound and can be measured by any known determination method. Examples of such methods include infrared (IR) spectroscopy or the HCl-pyridine titration method through reaction with excess HCl in pyridine and titration of the remaining HCl with sodium methoxide, or titration in chloroform with perchloric acid in the presence of excess tetraethylammonium bromide and glacial acetic acid with an agitator of crystal violet (hexamethyl pararosaniline chloride, or by titrating a sample of the reaction product with tetrabutylammonium iodide and perchloric acid).

According to another embodiment, the aqueous epoxy resin dispersion includes a reactive epoxy resin comprising a bisphenol based resin selected from the group of bisphenol A glycidyl ethers, bisphenol F glycidyl ethers, modified bisphenol A glycidyl ethers, modified bisphenol F glycidyl ethers and mixtures thereof and has an epoxy equivalent weight of between 450 g/eq-2000 g/eq.

In one embodiment, the polyamine component contains a cycloaliphatic polyamine compound having the formula (1)

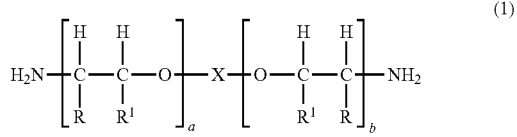

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5.

The cycloaliphatic polyamine compound of formula (1) can be prepared by methods known to those skilled in the art. For example, it can be prepared utilizing an initiator as a starting raw material that is charged to an alkoxylation reaction zone. The initiator may be any oxyalkylation susceptible polyhydric alcohol containing 2 to 4 hydroxyl groups. Examples of the initiator include: a diol such a 1,3-diol including 1,3-propandiol, 1,3-butanediol, neopentyl glycol, 2-methyl-1,3-propanediol and 2,2,4-trimethyl-1,3-pentanediol, hexylenediol; a triol, such as trimethylolpropane and triethylolpropane; and a tetrol such as pentaerythritol.

After charging, the initiator is then contacted with an alkylene oxide in the alkoxylation reaction zone for a period of time sufficient to provide a precursor polyol. The alkylene oxide may be an alkylene oxide having the formula:

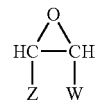

where Z and W are independently of one another hydrogen or a linear or branched $C_1$-$C_5$ alkyl group. Preferably, the alkylene oxide is ethylene oxide, propylene oxide, isobutylene oxide, 1,2-butylene oxide, 2,3-butylene oxide, pentylene oxide or styrene oxide. The amount of alkylene oxide which is contacted with the initiator may range from about 1.2-1.8 moles, and in some instances from about 1.4-1.6 moles, of alkylene oxide per mole of initiator. Additionally, the period of time the initiator is contacted with the alkylene oxide is a period of time sufficient to form the precursor polyol and in some instances may range from about 0.5 hours to about 24 hours.

The alkoxylation reaction zone can be a closed reaction vessel with alkoxylation being carried out under elevated temperature and pressure and in the presence of a base catalyst. For example, alkoxylation may be conducted at a temperature ranging from about 50° C. to about 150° C. and a pressure ranging from about 40 psi to about 100 psi. The base catalyst may be any alkaline compound customarily used for base-catalyzed reactions, for example, an alkali metal hydroxide such as sodium hydroxide, lithium hydroxide, potassium hydroxide, or cesium hydroxide, or a tertiary amine, such as dimethyl cyclohexylamine or 1,1,3,3-tetramethylguanidine. After alkoxylation, the resulting product may be vacuum stripped to remove any unnecessary components, such as excess unreacted alkylene oxide, water and/or base catalyst, while leaving the resulting precursor polyol.

The precursor polyol is then used as a feedstock in a reductive amination step. In some instances, prior to reductive amination, the precursor polyol is neutralized with acid or chemical adsorbent, such as for example, oxalic acid or magnesium silicate, and filtered for the removal of insoluble materials. The precursor polyol is charged to a reductive amination zone where it is brought into contact with a reductive amination catalyst, sometimes referred to as a hydrogenation-dehydrogenation catalyst, and reductively aminated in the presence of ammonia and hydrogen under reductive amination conditions. Reductive amination conditions may include, for example, a temperature within the range of about 150° C. to about 275° C. and a pressure within the range of about 500 psi to about 5000 psi with temperatures within the range of about 180° C. to about 220° C. and pressures within the range of about 1500 psi to about 2500 psi being used in many embodiments.

Any suitable hydrogenation catalyst may be used, such as those described in U.S. Pat. No. 3,654,370, the contents of which are incorporated herein by reference. In some embodiments, the hydrogenation catalyst may comprise one or more of the metals of group VIIIB of the Periodic Table, such as iron, cobalt, nickel, ruthenium, rhodium, palladium, platinum, mixed with one or more metals of group VIB of the Periodic Table such as chromium, molybdenum or tungsten. A promoter from group IB of the Periodic Table, such as copper, may also be included. As an example, a catalyst may be used comprising from about 60 mole percent to about 85 mole percent of nickel, about 14 mole percent to about 37 mole percent of copper and about 1 mole percent to about 5 mole percent of chromium (as chromia), such as a catalyst of the type disclosed in U.S. Pat. No. 3,152,998. As another example, a catalyst of the type disclosed in U.S. Pat. No. 4,014,933 may be used containing from about 70% by weight to about 95% by weight of a mixture of cobalt and nickel and from about 5% by weight to about 30% by weight of iron. As another example, a catalyst of the type disclosed in U.S. Pat. No. 4,152,353 may be used, comprising nickel, copper and a third component which may be iron, zinc, zirconium or a mixture thereof, for example, a catalyst containing from about 20% by weight to about 49% by weight of nickel, about 36% by weight to about 79% by weight of copper and about 1% by weight to about 15% by weight of iron, zinc, zirconium or a mixture thereof. As still another example, a catalyst of the type described in U.S. Pat. No. 4,766,245 may be used comprising about 60% by weight to about 75% by weight of nickel and about 25% by weight to about 40% by weight of aluminum.

The reductive amination is preferably conducted on a continuous basis with the precursor polyol, ammonia and hydrogen being continuously charged to a reactor containing a fixed bed of reductive amination catalyst and with product being continually withdrawn.

The product is suitably depressured so as to recover excess hydrogen and ammonia for recycle and is then fractionated to remove byproduct water of reaction and to provide the desired polyamine.

During reductive amination, the reductive amination conditions which can be utilized include the use of from about 4 moles to about 150 moles of ammonia per hydroxyl equivalent of precursor polyol feedstock. Hydrogen is preferably used in an amount ranging from about 0.5 mole equivalents to about 10 mole equivalents of hydrogen per hydroxyl equivalent of precursor polyol feedstock. The contact times within the reaction zone, when the reaction is conducted on a batch basis, may be within the range of from about 0.1 hours to about 6 hours and more preferably from about 0.15 hours to about 2 hours.

When the reaction is conducted on a continuous basis using catalyst pellets, reaction times may be from about 0.1 grams to about 2 grams of feedstock per hour per cubic centimeter of catalyst and, more preferably, from about 0.3 grams to about 1.6 grams of feedstock per hour per cubic centimeter of catalyst.

Also, the reductive amination may be conducted in the presence of about 1 mole to about 200 moles of ammonia per mole of precursor polyol and more preferably, from about 4 moles to about 130 moles of ammonia per mole of precursor polyol. From about 0.1 moles to about 50 moles of hydrogen per mole of precursor polyol may be employed and, more preferably, from about 1 mole to about 25 moles of hydrogen per mole of precursor polyol.

Formation of the reaction product of the aqueous epoxy resin dispersion and polyamine component takes place in the presence of water which is contained in the aqueous epoxy resin dispersion. Furthermore, in some embodiments, additional water may be added during and/or after formation of the reaction product such that a desired solids level is obtained, for example, water may be added during and/or after formation of the reaction product such that a solids level of 20% by weight or more; preferably 40% by weight or more; and even more preferably 50% by weight or more is obtained. In another embodiment, water is added during and/or after formation of the reaction product such that a solids level of 80% by weight or less, preferably 75% by weight or less, and even more preferably 70% by weight or less is obtained.

Formation of the reaction product may also take place in the presence of one or more surfactants. Any known surfactant may used. For example, commercially available surfactants which may be used include ethoxylated fatty acids such as Disponil® brand surfactants; polyoxyethylenated alkylphenols such as Tergitol® brand surfactants, solutions of copolymer with acidic groups such as Disperbyk® brand surfactants, and ethoxylated acetylenic diols such as Surfynol® brand surfactants. In addition, the surfactant may be based on the condensation product of (i) an aliphatic polyol having an average molecular weight of 200-20,000 g/mol and (ii) a diepoxide having an equivalent weight of 90-3000 g/mol wherein the equivalent ratio of the OH groups to the epoxy groups is 1:0.85 to 1:3.0 and the epoxide equivalent weight of the condensation product is between 500-400,000 g/eq. These surfactants are described in U.S. Pat. No. 5,236,974 at col. 1, line 32 to col. 9. line 30, the contents of which is hereby incorporated by reference.

In some embodiments, the equivalent ratio of polyamine component (B) to aqueous epoxy resin dispersion (A) used in forming the reaction product may range from about 2:1 to about 12:1. In another embodiment, the equivalent ratio of polyamine component (B) to aqueous epoxy resin dispersion (A) may range from about 4:1 to about 8:1.

The present disclosure further provides a process for the preparation of the water-based amine curing agent. As described above, the aqueous epoxy resin dispersion is contacted with the polyamine component in the presence or absence of surfactant. The reaction may be performed at ambient temperature or higher temperatures. In one embodiment, the reaction is performed at a controlled temperature of between about 20° C.-100° C., and in some embodiments at a controlled temperature of between about 40° C.-70° C. The temperature during reaction is maintained for a time sufficient to form the reaction product containing amine active hydrogens.

The water-based amine curing agent can be formulated with a curable epoxy resin composition for use in coatings, especially water-based coatings. Thus, in yet another embodiment there is provided a two part coating system which consists of (1) the water-based amine curing agent according to the present disclosure and (2) the curable epoxy resin composition. The amount of water-based amine curing agent used in the coating system is an amount sufficient to cure the epoxy resin composition and form a continuous coating. In one embodiment, the amounts of the water-based amine curing agent and curable epoxy resin composition in the coating system are such that the ratio of epoxy equivalents in the curable epoxy resin composition to amine equivalents in the water-based amine curing agent is from 0.5:1 to 2:1; in some instances from 0.6:1.4 to 1.4:0.6; and in more instances from 0.8:1.2 to 1.2:0.8 and even more instances from 0.9:1.1 to 1.1:0.9.

The curable epoxy resin composition includes any known curable epoxy resin, for example, mono- and/or polyepoxide resins which include, but are not limited to, the reactive epoxy resins described above. In one embodiment, the curable epoxy resin is a glycidyl ether of bisphenol or bisphenol F, an advanced glycidyl ether of bisphenol A or bisphenol F, a liquid diepoxide of a novolac resin or a mixture thereof.

If desired, either one or both of the water-based amine curing agent and curable epoxy resin composition may be mixed, before curing, with one or more customary additives, for example, a stabilizer, extender, filler, reinforcing agent, pigment, dyestuff, plasticizer, tackifier, rubber, accelerator, diluent or any mixture thereof.

Stabilizers which may be employed include: phenothiazine itself or C-substituted phenothiazines having 1 to 3 substituents or N-substituted phenothiazines having one substituent for example, 3-methyl-phenothiazine, 3-ethyl-phenothiazine, 10-methyl-phenothiazine; 3-phenyl-phenothiazine, 3,7-diphenyl-phenothiazine; 3-chlorophenothiazine, 2-chlorophenothiazine, 3-bromophenothiazine; 3-nitrophenothiazine, 3-aminophenothiazine, 3,7-diaminophenothiazine; 3-sulfonyl-phenothiazine, 3,7-disulfonyl-phenothiazine, 3,7-dithiocyanatophenthiazin; substituted quinines and catechols, copper naphthenate, zinc-dimethyldithiocarbonate and phosphotungistic acid hydrate. Extenders, reinforcing agents, fillers accelerators and pigments which can be employed include, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, eugenol, dicummyl peroxide, isoeugenol, carbon black, graphite, and iron powder. It is also possible to add other additives, for example, flameproofing agents, flow control agents such as silicones, cellulose acetate butyrate, polyvinyl butyrate, waxes, stearates and the like (which are in part also used as mold release agents).

In another embodiment, the present disclosure provides a method of forming a coating on a substrate with the two part coating system. The method includes contacting the water-based amine curing agent with the curable epoxy resin composition, which in most instances is dispersed in water, and applying the combined materials onto a substrate. The coating is then subjected to curing conditions to cure the coating such conditions including ambient conditions or under heat. In another embodiment, the water-based amine curing agent is contacted with the curable epoxy resin composition in a solid form, the mixture is blended, dispersed in water, applied onto a substrate and the coating is then subjected to curing conditions as described above.

The applied coating may be allowed to cure for any period of time sufficient to allow the coating to harden, such as, for example from 1 minute to about 10 days. In another embodiment, in order to achieve more rapid and/or more complete curing, the coatings obtained from the water-based amine curing agent and curable epoxy resin composition according to the present disclosure are heated at 50° C. to 120° C. for a period of time, such as for about 1 minute to about 24 hours. Thus, in yet another embodiment there is provided an article or substrate coated with the two part coating system of the present disclosure.

The two part coating system of the present disclosure may be used in a variety of applications, such as primers, varnishes, fillers, clear sealers, protective paints, coverings, sealings, thin mortars and the like. They may also be used for various laminated supports such as cemented floors, walls, swimming pools, glazed tiles, etc.

According to one embodiment, the two part coating system is used as a protective coating for a substrate. The water-based amine curing agent may be applied to one or more surfaces of a substrate, prior to, subsequently to, or simultaneously with the curable epoxy resin composition, at a desired thickness by methods well known to those skilled in the art, such as, spraying, dipping, brushing, painting, roller coating, etc. After application, the coating is cured at ambient conditions and/or by the application of heat. The substrate may be, but is not limited to, cement, metal, concrete, brick, cement board, or drywall. The two part coating system may be used as either a primer, mid- or topcoat coating or surface protectant.

EXAMPLES

Example 1

This example illustrates the preparation of a water-based amine curing agent according to the present disclosure. A 500 mL, 4 necked round bottom flask, equipped with a mechanical stirrer, thermocouple and dropping funnel, was charged with 45 grams (0.672 eq) of a cycloaliphatic polyamine compound (Jeffamine® RFD 270 polyamine), 41 grams of water and 11 grams of surfactant (PEG4000 surfactant), which is based on the preparation as illustrated in Example 1-1 of U.S. Pat. No. 5,236,974). The contents of the flask were heated to 60° C., and 100 grams of an aqueous epoxy resin dispersion (Araldite® PZ 3961 resin) was added within a few minutes while maintaining a reaction temperature within the flask of 60° C. After the addition was complete, the temperature of the mixture was held at 60° C. for a further 60 minutes and the reaction product was transferred into an appropriate container. The reaction product obtained was a white dispersion having a solids content of 54% by weight, an amine hydrogen equivalent weight (AHEW) of 348 g/eq, and a viscosity of 328 mPa·s at 25° C.

Examples 2-4

Additional water-based amine curing agents not according to the present disclosure were prepared following the procedures outlined in Example 1. Example 2 was prepared from a poly(oxypropylene) diamine (Jeffamine® D230 amine); Example 3 was prepared from isophoronediamine; and Example 4 was prepared from 1,2-diaminocyclohexane. The reaction product of Example 2 had a solids content of 51% by weight, an AHEW of 350 g/eq, and a viscosity of 141 mPa·s at 25° C. The reaction product of Example 3 had a solids content of 53% by weight, an AHEW of 347 g/eq, and a viscosity of 513 mPa·s at 25° C. The reaction product of Example 4 had a solids content of 52% by weight, an AHEW of 347 g/eq, and a viscosity of 270 mPa·s at 25° C. Table 1 further summarizes the properties of Examples 1-4:

TABLE 1

| Property | Example 1 | Example 2 | Example 3 | Example 4 |
|---|---|---|---|---|
| Particle Size (μm) | | | | |
| d(0.5) | 2.704 | 198.232 | 13.012 | 1.154 |
| d(0.9) | 4.710 | 380.465 | 263.429 | 40.618 |

TABLE 1-continued

| Property | Example 1 | Example 2 | Example 3 | Example 4 |
|---|---|---|---|---|
| Particle Size After 1 Month in 40° C. Chamber | | | | |
| d(0.5) | 3.107 | Not Stable* | Not Stable* | Not Stable* |
| d(0.9) | 5.351 | | | |
| AHEW (g/eq) | 348 | 350 | 347 | 347 |
| Total Solids Content (wt %) | 54 | 52 | 53 | 52 |
| Viscosity at 25° C. (mPa·s) | 328 | 141 | 513 | 270 |

*not stable overnight.

Example 5

Coatings were prepared from the water-based amine curing agents of Examples 1-4 and a liquid curable epoxy resin composition (Araldite® GY6010 resin). The coatings exhibited the following properties.

TABLE 2

| Property | Example 1 + Epoxy Resin | Example 2 + Epoxy Resin | Example 3 + Epoxy Resin | Example 4 + Epoxy Resin |
|---|---|---|---|---|
| Film | Clear | Clear | Hazy | Hazy Surface Tacky |
| Persoz Hardness | | | | |
| 1 day | 237 | 43 | 99 | 39 |
| 7 days | 307 | 129 | 174 | 88 |
| Pencil Hardness | F | 5B | B | 6B |

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A water-based amine curing agent for a curable resin which is a reaction product obtained from the reaction of:
   (A) an aqueous epoxy dispersion; and
   (B) a polyamine component consisting of a cycloaliphatic polyamine compound having the formula (1)

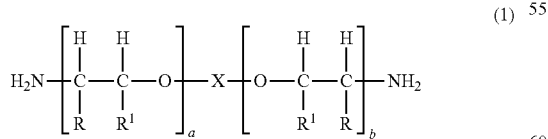

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5.

2. The water-based amine curing agent of claim 1, wherein the reaction product is formed in the presence of a surfactant.

3. The water-based amine curing agent of claim 2, wherein the surfactant comprises a condensation product of (i) an aliphatic polyol having an average molecular weight of 200-20,000 g/mol and (ii) a diepoxide having an equivalent weight of 90-3000 g/mol and wherein the equivalent ratio of the OH groups to the epoxy groups is 1:0.85 to 1:3 and the epoxide equivalent weight of the condensation product is between 500-400,000 g/eq.

4. The water-based amine curing agent of claim 1, wherein the aqueous epoxy resin dispersion has an epoxy equivalent weight of 450 g/eq-2000 g/eq.

5. The water-based amine curing agent of claim 4, wherein the aqueous epoxy resin dispersion has an epoxy equivalent weight of 475 g/eq-600 g/eq.

6. The water-based amine curing agent of claim 1, wherein water is added during and/or after formation of the reaction product such that the curing agent has a solids level of 20% by weight or more.

7. The water-based amine curing agent of claim 6, wherein water is added during and/or after formation of the reaction product such that the curing agent has a solids level of 50% by weight or more.

8. The water-based amine curing agent of claim 1, wherein the equivalent ratio of polyamine component (B) to aqueous epoxy resin dispersion (A) used in forming the reaction product ranges from about 2:1 to about 12:1.

9. The water-based amine curing agent of claim 8, wherein the equivalent ratio of polyamine component (B) to aqueous epoxy resin dispersion (A) used in forming the reaction product ranges from about 4:1 to about 8:1.

10. A method of forming a coating on a substrate comprising contacting the water-based amine curing agent of claim 1 with a curable epoxy resin composition and applying the combined materials onto a substrate.

11. A method of forming a cured coating on a substrate comprising contacting the water-based amine curing agent of claim 1 with a curable epoxy resin composition, applying the combined materials onto a substrate to form a coating, and subjecting the coating to curing conditions.

12. A cured coating produced according to the method of claim 11.

13. A substrate coated with a two part coating system consisting of
   (1) the water-based amine curing agent of claim 1; and
   (2) a curable epoxy resin composition
and wherein part (1) and/or part (2) optionally contain at least one stabilizer, extender, filler, reinforcing agent, pigment, dyestuff, plasticizer, tackifier, rubber, accelerator, diluent, flameproofing agent, flow control agent or any mixture thereof.

14. A two part coating system consisting of:
   (1) the water-based amine curing agent of claim 1; and
   (2) a curable epoxy resin composition
and optionally wherein part (1) and/or part (2) further contain at least one stabilizer, extender, filler, reinforcing agent, pigment, dyestuff, plasticizer, tackifier, rubber, accelerator, diluent, flameproofing agent, flow control agent or any mixture thereof.

15. The two part coating system of claim 14, wherein the amounts of the water-based amine curing agent and curable epoxy resin composition present are such that the ratio of epoxy equivalents in the curable epoxy resin composition to amine equivalents in the water-based amine curing agent is from 0.5:1 to 2:1.

16. A process for preparing a water-based amine curing agent comprising contacting an excess of a polyamine component (B) consisting of a cycloaliphatic polyamine compound having the formula (1)

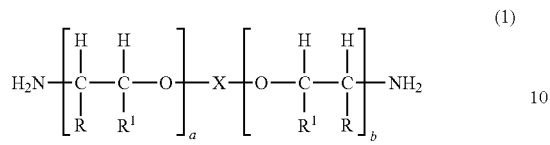

(1)

where R and $R^1$ are, in each instance independently of one another hydrogen or a linear or branched $C_1$-$C_5$ alkyl group; X is a $C_6$-$C_{20}$ cycloaliphatic radical; a is an integer from 1-5; and b is an integer from 1-5 with an aqueous epoxy dispersion component (A) such that the reaction product contains amine active hydrogens capable of reacting with a curable resin.

17. The process of claim 16, wherein the reaction is performed at a controlled temperature of between about 20° C.-100° C.

* * * * *